United States Patent
Lorey

(10) Patent No.: US 9,377,074 B2
(45) Date of Patent: Jun. 28, 2016

(54) DEVICE COMPRISING A SUSPENSION SYSTEM

(71) Applicant: GRAMMER AG, Amberg (DE)

(72) Inventor: Konstantin Lorey, Schmidgaden (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/314,719

(22) Filed: Jun. 25, 2014

(65) Prior Publication Data

US 2015/0001771 A1    Jan. 1, 2015

(30) Foreign Application Priority Data

Jun. 26, 2013   (DE) .................. 10 2013 106 709

(51) Int. Cl.
| | |
|---|---|
| *F16F 5/00* | (2006.01) |
| *F16F 9/02* | (2006.01) |
| *B60N 2/50* | (2006.01) |
| *B60N 2/52* | (2006.01) |

(Continued)

(52) U.S. Cl.
CPC .............. *F16F 9/0218* (2013.01); *B60N 2/501* (2013.01); *B60N 2/525* (2013.01); *F16F 9/0281* (2013.01); *F16F 9/049* (2013.01); *F16F 9/50* (2013.01)

(58) Field of Classification Search
CPC .......... B60N 2/14; B60N 2/501; B60N 2/522; B60N 2/502; B60N 2/508; B60N 2/509; B60N 2/06; B60G 17/0155; B60G 17/0165; B60G 17/0416; B63B 29/04; F16F 9/0218; F16F 9/0281
See application file for complete search history.

(56) References Cited

U.S. PATENT DOCUMENTS

| | | | |
|---|---|---|---|
| 1,908,902 | A | 5/1933 | Knoll |
| 2,725,078 | A | 11/1955 | Glancy |
| 3,148,869 | A | 9/1964 | Peterson |

(Continued)

FOREIGN PATENT DOCUMENTS

| | | |
|---|---|---|
| CH | 138281 | 2/1930 |
| DE | 1287453 | 1/1969 |

(Continued)

OTHER PUBLICATIONS

Extended European Search Report (no English translation available) for German Patent Application No. 14173618.1 dated Nov. 19, 2014, 133 pages.

(Continued)

*Primary Examiner* — Christopher Schwartz
(74) *Attorney, Agent, or Firm* — Sheridan Ross P.C.

(57) ABSTRACT

The invention relates to a device comprising a suspension system, which suspension system comprises a first part to which a mass is applied, a second part and an air spring arranged between said first part and said second part, at least one additional volume means for air being provided, the volume of which can be connected in a controlled manner, and a control means for connecting the volume of the additional volume means, wherein, via the control means, a pressure accumulator and the additional volume means are in fluid communication with the air spring such that a force/displacement characteristic line of the air spring can itself be modified depending on a deflection displacement and/or rebound displacement and/or speed and/or acceleration of the first part in a presettable manner, by connecting the additional volume and/or the pressure accumulator by means of the control means during the deflection and/or rebound of the first part.

12 Claims, 7 Drawing Sheets

(51) Int. Cl.
*F16F 9/50* (2006.01)
*F16F 9/04* (2006.01)

(56) References Cited

U.S. PATENT DOCUMENTS

| | | | |
|---|---|---|---|
| 3,470,692 A | 10/1969 | Kamp | |
| 3,480,293 A * | 11/1969 | Fultz | B60G 17/052 180/41 |
| 3,596,895 A | 8/1971 | Hirtreiter | |
| 3,732,944 A | 5/1973 | Kendall | |
| 3,938,770 A * | 2/1976 | Turner | B60N 2/501 248/550 |
| 4,087,069 A | 5/1978 | Hall et al. | |
| 4,139,186 A | 2/1979 | Postema et al. | |
| 4,418,955 A * | 12/1983 | Muncke | B62D 33/0608 180/89.12 |
| 4,497,078 A | 2/1985 | Vogel et al. | |
| 4,502,673 A * | 3/1985 | Clark | B62D 33/071 180/89.15 |
| 4,526,258 A | 7/1985 | Huber | |
| 4,531,761 A | 7/1985 | von Sivers | |
| 4,733,847 A | 3/1988 | Grassl | |
| 4,936,423 A | 6/1990 | Karnopp | |
| 5,169,112 A * | 12/1992 | Boyles | B60N 2/501 248/406.2 |
| 5,273,240 A | 12/1993 | Sharon | |
| 5,290,089 A | 3/1994 | Oleszko et al. | |
| 5,294,085 A | 3/1994 | Llloyd et al. | |
| 5,538,117 A | 7/1996 | Bouchez | |
| 5,871,257 A | 2/1999 | Dundes, Sr. | |
| 5,876,085 A | 3/1999 | Hill | |
| 6,120,082 A | 9/2000 | Vandermolen | |
| 6,467,748 B1 | 10/2002 | Schick et al. | |
| 6,857,674 B2 | 2/2005 | Chareyre | |
| 7,341,645 B2 | 3/2008 | Fong | |
| 7,568,675 B2 | 8/2009 | Catton | |
| 7,699,147 B2 | 4/2010 | Preukschat et al. | |
| 7,997,600 B2 * | 8/2011 | Haller | B60G 17/0155 280/124.157 |
| 8,342,541 B2 * | 1/2013 | Wurmthaler | B60N 2/501 248/636 |
| 8,439,420 B2 | 5/2013 | Cantor et al. | |
| 8,632,061 B2 | 1/2014 | Nemoto | |
| 8,757,600 B2 * | 6/2014 | Haller | B60N 2/501 248/566 |
| 9,120,410 B2 * | 9/2015 | Bauman | B63B 29/04 |
| 9,140,328 B2 | 9/2015 | Lorey | |
| 2001/0015565 A1 | 8/2001 | Motozawa et al. | |
| 2002/0145315 A1 | 10/2002 | Fraley et al. | |
| 2004/0112659 A1 | 6/2004 | Kramer et al. | |
| 2004/0251097 A1 | 12/2004 | Barbison et al. | |
| 2007/0084687 A1 | 4/2007 | Foster et al. | |
| 2008/0156602 A1 | 7/2008 | Hiemenz et al. | |
| 2009/0134595 A1 * | 5/2009 | Haller | B60G 17/0155 280/124.157 |
| 2009/0218867 A1 | 9/2009 | Clark | |
| 2010/0072760 A1 | 3/2010 | Anderson et al. | |
| 2010/0117411 A1 | 5/2010 | Fujita et al. | |
| 2010/0181708 A1 * | 7/2010 | Kolb | B60G 17/0416 267/113 |
| 2010/0276959 A1 | 11/2010 | Jang | |
| 2011/0001342 A1 | 1/2011 | Deml et al. | |
| 2011/0006567 A1 | 1/2011 | Mullen | |
| 2011/0018316 A1 | 1/2011 | Meredith et al. | |
| 2011/0277433 A1 | 11/2011 | Sugden et al. | |
| 2011/0278894 A1 | 11/2011 | Lorey | |
| 2012/0007293 A1 | 1/2012 | Bauer et al. | |
| 2012/0025577 A1 | 2/2012 | Kolb | |
| 2012/0091679 A1 | 4/2012 | Kashi et al. | |
| 2012/0091773 A1 | 4/2012 | Lorey | |
| 2012/0145875 A1 | 6/2012 | Haller et al. | |
| 2012/0153689 A1 | 6/2012 | Haller et al. | |
| 2012/0153695 A1 | 6/2012 | Haller et al. | |
| 2013/0112839 A1 | 5/2013 | Kato et al. | |
| 2013/0161138 A1 | 6/2013 | Barefoot | |
| 2013/0341484 A1 | 12/2013 | Yamada et al. | |
| 2014/0354027 A1 | 12/2014 | Kolb | |
| 2014/0354030 A1 | 12/2014 | Kolb | |
| 2015/0090549 A1 | 4/2015 | Haller | |
| 2015/0165933 A1 | 6/2015 | Kolb | |

FOREIGN PATENT DOCUMENTS

| | | |
|---|---|---|
| DE | 2016973 | 10/1970 |
| DE | 2756624 | 6/1979 |
| DE | 141769 | 5/1980 |
| DE | 2059720 | 6/1980 |
| DE | 3517345 | 11/1986 |
| DE | 3517505 | 11/1986 |
| DE | 3831724 | 3/1990 |
| DE | 3930612 | 3/1991 |
| DE | 4037289 | 5/1992 |
| DE | 3686619 | 4/1993 |
| DE | 4216987 | 7/1993 |
| DE | 3785493 | 10/1993 |
| DE | 19938698 | 2/2001 |
| DE | 20116588 | 5/2002 |
| DE | 10306564 | 8/2004 |
| DE | 102004013308 | 12/2005 |
| DE | 60116693 | 7/2006 |
| DE | 102005011856 | 8/2006 |
| DE | 102005048949 | 12/2006 |
| DE | 102006016140 | 10/2007 |
| DE | 102007039215 | 2/2009 |
| DE | 202007013300 | 2/2009 |
| DE | 102008016685 | 6/2009 |
| DE | 102008020865 | 11/2009 |
| DE | 102008050142 | 3/2010 |
| DE | 102008037547 | 5/2010 |
| DE | 102009022763 | 12/2010 |
| DE | 202011005606 | 12/2011 |
| DE | 102010033419 | 2/2012 |
| DE | 102010037842 | 3/2012 |
| DE | 102010051325 | 5/2012 |
| DE | 102010055342 | 6/2012 |
| DE | 102010055344 | 6/2012 |
| DE | 102011100307 | 11/2012 |
| DE | 102011085879 | 5/2013 |
| EP | 0322608 | 7/1989 |
| EP | 1186467 | 3/2002 |
| EP | 1464866 | 10/2004 |
| EP | 1643155 | 4/2006 |
| EP | 2468568 | 4/2006 |
| EP | 2062758 | 5/2009 |
| EP | 2468567 | 6/2012 |
| FR | 1081491 | 12/1954 |
| FR | 1364719 | 6/2012 |
| GB | 1295410 | 11/1972 |
| JP | S62-18346 | 1/1987 |
| JP | S62-18347 | 1/1987 |
| WO | WO 91/04168 | 4/1991 |
| WO | WO 99/33676 | 7/1999 |

OTHER PUBLICATIONS

Official Action (no English translation available) for German Patent Application No. 102013106709.3 dated Feb. 28, 2014, 5 pages.
U.S. Appl. No. 14/915,754, filed Mar. 1, 2016, Haller.
Official Action (no English translation available) for German Patent Application No. 102013110370.7 dated Feb. 20, 2014, 3 pages.
Official Action (no English translation available) for German Patent Application No. 102013104926.5 dated Apr. 2, 2014, 8 pages.
Official Action (no English translation available) for German Patent Application No. 102013110358.8 dated Feb. 6, 2014, 3 pages.
Extended European Search Report (no English translation available) for European Patent Application No. 14170683.8, dated Jan. 8, 2015, 6 pages.
Extended European Search Report for European Patent Application No. 14180567.1, dated Feb. 19, 2015, 9 pages.
Official Action (no English translation available) for German Patent Application No. 102013110919.5, dated Jul. 7, 2014, 3 pages.
Official Action for German Patent Application No. 102013021561.7, dated Oct. 29, 2014, 7 pages.

(56) References Cited

OTHER PUBLICATIONS

Official Action for U.S. Appl. No. 14/276,122, mailed Mar. 27, 2015, 5 pages Restriction Requirement.
Notice of Allowance for U.S. Appl. No. 14/276,122, mailed Jun. 17, 2015, 9 pages.
Official Action for U.S. Appl. No. 14/294,356, mailed Jun. 8, 2015, 15 pages.
Official Action for U.S. Appl. No. 14/294,356, mailed Sep. 24, 2015, 17 pages.
Notice of Allowance for U.S. Appl. No. 14/294,356, mailed Nov. 30, 2015, 16 pages.
Official Action for U.S. Appl. No. 14/468,977, mailed Jul. 21, 2015, 11 pages.
Official Action for U.S. Appl. No. 14/468,977, mailed Dec. 4, 2015, 11 pages.

* cited by examiner

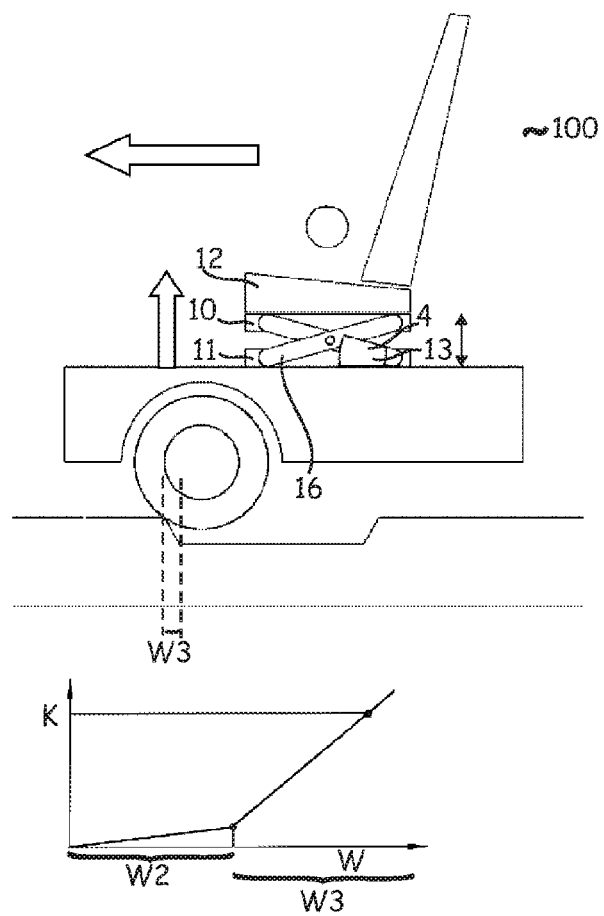
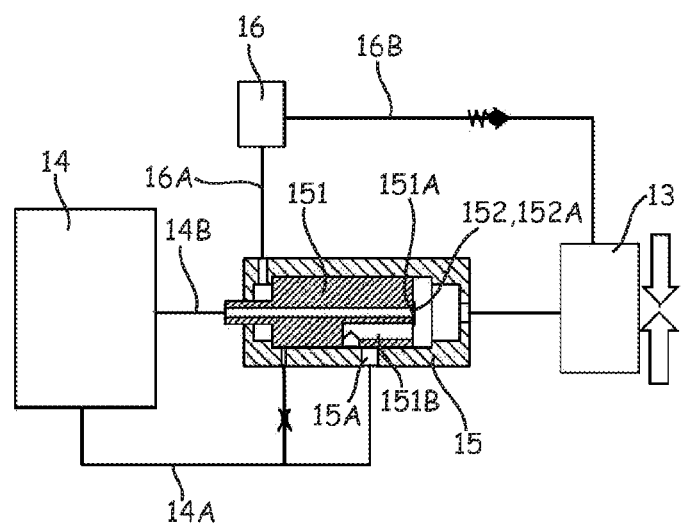
Fig. 5A
Fig. 5B

DEVICE COMPRISING A SUSPENSION SYSTEM

CROSS-REFERENCE TO RELATED APPLICATIONS

This application claims the benefit of German Patent Application No. DE 10 2013 106 709.3 filed Jun. 26, 2013, the entire disclosure of which is incorporated herein by reference.

FIELD

The present invention relates to a suspension system with an air spring and a controller.

BACKGROUND

The present invention relates to a device comprising a suspension system, which suspension system comprises a first part to which a mass is applied, a second part as well as at least one air spring arranged between the first part and said second part, at least one additional volume means for air being provided, the volume of which can be connected to a volume of the air spring in a controlled manner, as well as a control means for connecting the volume of the additional volume means.

Devices comprising a suspension system which has an additional volume means are known from the prior art. If required, in such devices which are already known from the prior art, the additional volume means can for example be manually connected and/or disconnected in order for it to be possible to set a force/displacement characteristic line of the air spring. In this case, "force/displacement line" refers to a characteristic line of the air spring, in which a resilience of the air spring is plotted against a deflection displacement and/or rebound displacement of the air spring in a two-dimensional coordinate system.

If, for example, the volume of the additional volume means is connected to the air spring, then this makes it possible to set the suspension properties to a softer damping of the air spring, whereas if the additional volume means is disconnected from the air spring, deflection is harder. In other words, if required, a force/displacement characteristic line of the air spring can be set by a connection or disconnection via the additional volume means without the air pressure in the air spring being modified. Therefore, larger spring ranges are possible at the same pressure (resilience). Gentle, low-frequency seat movements as well as greater seating comfort are thus produced.

If the vehicle travels for example over an unmade and uneven region, it is conceivable for the additional volume means not to be connected, so that direct impact against an element at the end of the range of the spring is prevented. Such a force/displacement characteristic line is shown in FIG. 1A ("K" stands for force and "W" stands for displacement), from which it can be seen that at the impact point A1 or up to the impact point A1, the air spring continuously deflects within the force/displacement characteristic line in accordance with a presettable gradient. This provides the advantage of greater resilience in the case of strong excitation and makes it possible for a driver to prevent disadvantageous and uncomfortable sudden impacts against the element at the end of the range of the air spring when the air spring completely deflects.

However, such a steep setting of the characteristic line, for example by disconnecting the additional volume means from the air spring, generally reduces comfort in normal driving operation and for example provides worse "SEAT values", that is to say measured values relating to individual physical measured variables and the effects on the passengers associated therewith.

If, for example, the vehicle then travels over a made road which is not greatly uneven, the force/displacement characteristic line may become shallower owing to the additional volume being connected to the air spring, so that the air spring can deflect more softly, thereby significantly increasing comfort in normal driving operation. However, on the other hand this is disadvantageous in that if there is an unexpected pothole on the made road, when driving over the pothole, extremely high spring ranges are covered with such strong excitation, and there is the risk that if the impact point A1 is suddenly reached, the deflection is abruptly stopped, thereby causing a sudden increase in the force acting on the passengers in the vehicle (see FIG. 1B).

SUMMARY

The present invention relates to a device comprising a suspension system, which suspension system comprises a first part to which a mass is applied, a second part as well as at least one air spring arranged between the first part and said second part, at least one additional volume means for air being provided, the volume of which can be connected to a volume of the air spring in a controlled manner, as well as a control means for connecting the volume of the additional volume means.

The problem addressed by the present invention is therefore that of providing a device comprising a suspension system in which a force/displacement characteristic line of the vehicle seat itself can be set individually on the device depending on a deflection displacement and/or rebound displacement and/or deflection or rebound speed and/or deflection or rebound acceleration of a first part, for example a seat surface of the vehicle seat, relative to the second part of the device, for example a base element of the vehicle seat, without the assistance and actuation of a switch or any other manual actuation, in order to continuously maintain the seat comfort irrespective of the state of the road which is to be traveled.

This problem is solved by the subject matter of amended claim 1.

In order to now provide a device comprising a suspension system in which, in a particularly simple and elegant manner, such a force/displacement characteristic line of the air spring during the deflection and/or rebound of the first part can itself be individually adapted to the respective road conditions, the present invention inter alia applies the concept that, via the control means, a pressure accumulator and the additional volume means are in fluid communication with the air spring such that the force/displacement characteristic line of the air spring can be modified depending on a deflection displacement and/or rebound displacement and/or deflection or rebound speed and/or deflection or rebound acceleration of the first part relative to the second part in a presettable manner, by connecting the additional volume means and/or the pressure accumulator by means of the control means during the deflection and/or rebound of the first part relative to the second part. Preferably, this is purely mechanical control. This means that the device described herein and more particularly the control means are free of electrical components, thereby resulting in a particularly robust and durable component that does not require electrical energy.

As already explained above, the present invention makes it possible to set a shallow force/displacement characteristic line, that is to say a particularly soft deflection in driving operation for example over a made road, in which little damping force is required, and on the other hand makes it possible to set a steep force/displacement characteristic line, that is to say a deflection, which is for example particularly hard, in the case of relatively strong excitation, so that heavy impacts are prevented solely by the control means when driving over a pothole, for example.

In addition, the present device comprising a suspension system provides the advantage of a reduction in energy, for example after a pothole without a loss of air, since the present system is preferably closed. In addition, a safety risk is prevented or a malfunction of the seat is prevented if the system malfunctions, since the present device is particularly robust in construction owing to the presently claimed control means, and in addition low production costs are required owing to the omission of additional electronic apparatuses, for example, for setting a spring stiffness of the air spring.

According to at least one embodiment, the device comprising a suspension system comprises a suspension system which comprises a first part to which a mass is applied, a second part and at least one air spring arranged between said first part and said second part. Here, at least one additional volume means for air is provided, of which the volume can be connected to the volume of the air spring in a controlled manner, as well as a control means is provided for connecting the volume of the additional volume means. In addition, via the control means, a pressure accumulator and the additional volume means are in fluid communication with the air spring such that a force/displacement characteristic line of the air spring can be modified depending on a deflection displacement and/or rebound displacement and/or deflection or rebound speed and/or deflection or rebound acceleration of the first part relative to the second part in a presettable manner, by connecting the additional volume and/or the pressure accumulator by means of the control means during the deflection and/or rebound of the first part relative to the second part.

According to at least one embodiment, the control means comprises a cylinder inside which a movable piston is arranged, it being possible to connect the additional volume and/or the pressure accumulator via a movement and/or a presettable position of the piston inside the cylinder. More particularly, by changing the internal pressure inside the air spring, the piston can be moved back and forth in the cylinder of the control means, it being possible for the additional volume means to be connected directly, preferably purely mechanically, via such a pressure change inside the air spring by means of the internal pressure thereof, for example by openings and ducts provided inside the control means and/or in the piston. Such a design of the control means including the piston which can move inside the control device therefore makes a particularly robust and cost-effective "closed-loop control means" available to the user, which can also react to individual internal pressure changes inside the air spring particularly rapidly and within short reaction times, over a long period of time.

According to at least one embodiment, the control means comprises at least one valve means, via which the position of the piston inside the cylinder can be modified and/or set in presettable manner, the additional volume and/or the pressure accumulator being brought into fluid communication with the air spring in an open position of the valve means. Preferably, the additional volume means is then only connected to the air spring if the valve means is operated in an open position. For this purpose, the valve means and the valve components thereof can be arranged inside the cylinder of the control means, for example on the piston itself, and/or on any inner wall of the control means. In other words, the position of the piston inside the cylinder of the control means can be precisely specified by a corresponding open- and/or closed position of the valve means, whereby in turn, that is to say by the individual control of the piston, the additional volume is directly connected to or disconnected from the air spring.

According to at least one embodiment, the valve means is in the form of a flapper valve, which is arranged on the piston over the air opening thereof, via which the additional volume means can be brought into fluid communication with the air spring. The design of the valve means in the form of a flapper valve provides a particularly cost-effective option for reacting to changes in air flow which are already low and/or rapid and for modifying flow intensities inside the air spring, such a flapper valve also not only being particularly simple to attach to the piston via the air opening thereof, but also being able to be produced cost-effectively. In this case, the air opening may be an opening, which is always arranged inside the cylinder, in a longitudinal duct which is entirely continuous inside the piston in the stroke direction.

According to at least one embodiment, the valve means can be operated in the open position if an internal pressure of the pressure accumulator is greater than an internal pressure of the air spring, it being possible for the piston to be displaced inside the cylinder via the open position of the valve means such that the additional volume means can be connected. If the valve means is in the form of the flapper valve, the following may be set out:

If the flapper valve is in an open position, then air from the additional volume can flow out of the air opening via the longitudinal duct in the piston and then can flow into the air spring, provided that the internal pressure inside the additional volume and/or the pressure accumulator is greater than the internal pressure inside the air spring and/or provided that an air flow flows from the additional volume towards the air spring. In such an open position, a force/displacement characteristic line of the air spring is therefore particularly shallow, whereas when the flapper valve is closed, an internal air pressure inside the air spring is greater than an internal pressure inside the additional volume and/or the air flow flows from the air spring towards the additional volume, so that the additional volume means and/or the pressure accumulator is disconnected from the air spring, whereby a hard deflection, that is to say a particularly steep force/displacement characteristic line, is set.

According to at least one embodiment, the valve means can be operated in the closed position if an internal pressure of the pressure accumulator is equal to an internal pressure of the air spring, an internal pressure of the additional volume means being less than one of the two other internal pressures. By connecting the pressure accumulator in this manner, the disconnection and/or connection can therefore be particularly finely adjusted.

According to at least one embodiment, depending on the deflection displacement and/or rebound displacement and/or speed and/or acceleration of the first part relative to the second part and on the internal pressure of the air spring which is dependent thereon, the flapper valve opens or closes automatically. By means of the flapper valve described herein, it is therefore not only possible to connect and disconnect the additional volume particularly rapidly and individually in response to slight pressure differences between the internal pressure in the air spring and the internal pressure inside the additional volume, but also such a connection may be carried out, without actuating a separate valve position or without manual actuation by the driver at the control means, via the flapper valve described herein during the deflection and/or rebound, also depending on the above-mentioned physical variables during driving.

According to at least one embodiment, after the deflection and/or rebound of the first part, a pressure compensation can be carried out by the control means, the internal pressures of the air spring, of the additional volume means and of the pressure accumulator, respectively, being equal in the pressure compensation. In other words, by means of the control means described herein, a pressure equilibrium can be produced within the entire device by means of the pressure compensation described herein, for example after deflection and driving over a kerb, for example, so that for example the piston described herein comes to a standstill inside the cylinder of the control means and, after driving over the kerb and a subsequent pressure compensation, the device for example softly deflects again, whilst said device still deflected according to a hard force/displacement characteristic line when driving over the kerb.

According to at least one embodiment, the air spring is also coupled to the additional volume means via a fluid connection of the piston, the fluid connection of the piston being in the form of a fluid duct inside the piston, and it being possible for the additional volume means to be connected via the fluid connection of the piston, via a movement of the piston in the cylinder. In this context, it is conceivable for the additional volume means to be coupled to the control means via a fluid duct and also for air to be introduced into the cylinder of the control means via such a coupling point. In particular, the control means and the cylinder may have an opening in the cylinder wall, via which the additional volume means is coupled by means of the fluid duct. If now an opening in the fluid connection of the piston overlaps with the opening in the cylinder, the air inside the additional volume means can also enter the air spring through the piston via the fluid duct, provided that the internal pressure of the additional volume is greater than the internal pressure of the air spring. The additional volume can therefore be connected to the air spring more rapidly and/or with a greater fluid exchange via such a fluid duct.

According to at least one embodiment, the first part is an oscillating part and the second part is a stationary part. In particular, the first part may be a deflecting seat surface and the second part may be a seat frame and/or an element of the vehicle floor, for example. In particular, the device comprising a suspension system may also be a vehicle seat which is installed in a passenger vehicle and/or a lorry, for example. In this respect, the device described herein and more particularly the control means described herein may be used particularly simply in such passenger vehicles and/or lorries, thereby providing a particularly wide range of options for use of the control means described herein and the device in its entirety, without the need to provide separate control means, each of which are only suitable for a single corresponding road condition.

According to at least one embodiment, the first part is coupled to the second part via a guide means. In particular, the guide means may be guide elements in the form of interlocking guide rods and/or a scissor-action frame. The scissor-action frame may be formed so as to comprise two scissor arms, it being conceivable for the air spring to be arranged between one of the two scissor arms of the scissor-action frame and the second part, so that for example the air spring is squeezed and thus the internal pressure inside the air spring is increased via a movement of one of the respective scissor arms towards the second part, it being possible in such a case for the additional volume means to be connected in a presettable manner, as described above, depending on the magnitude and for example intensity of the deflection.

The device described herein will be described in more detail in the following by means of an embodiment and the associated drawings, in which:

BRIEF DESCRIPTION OF THE DRAWINGS

FIG. 3A to 6B show various displacement phases and also respectively corresponding force/displacement characteristic lines in relation to a deflection of the shown device comprising a suspension system.

DETAILED DESCRIPTION

Figure 1A:
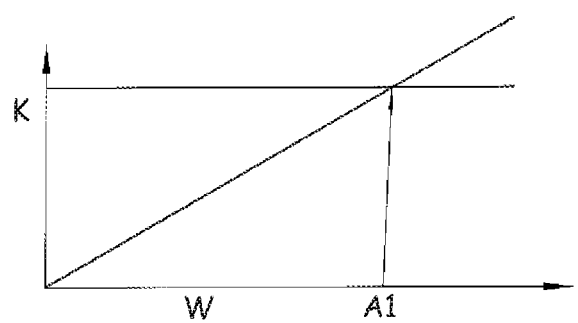
FIGS. 1A and 1B show force/displacement characteristic lines for devices known from the prior art, when an additional volume is connected and without an additional volume being connected to a device comprising a suspension system, which system comprises an air spring.

In the embodiments and in the drawings, like or similarly acting components are provided with like reference numerals. The illustrated elements are not drawn to scale, but rather individual elements are magnified for the sake of clarity.

FIG. 1A represents a situation in which the vehicle is driving over an unmade and uneven road, for example. In this situation, the additional volume means is not connected, so that direct impact against an element at the end of the range of the spring is prevented. Such a force/displacement characteristic line is shown in FIG. 1A, from which it can be seen that at the impact point A1 or up to the impact point A1, the air spring continuously deflects within the force/displacement characteristic line in accordance with a presettable gradient. This provides the advantage of greater resilience in the case of strong excitation and the ability of a driver to prevent disadvantageous and uncomfortable sudden impacts against the element at the end of the range of the air spring when the air spring completely deflects.

However, such a steep setting of the characteristic line, for example by disconnecting the additional volume means from the air spring, generally reduces comfort in normal driving operation and for example provides worse "SEAT values".

Figure 1B:
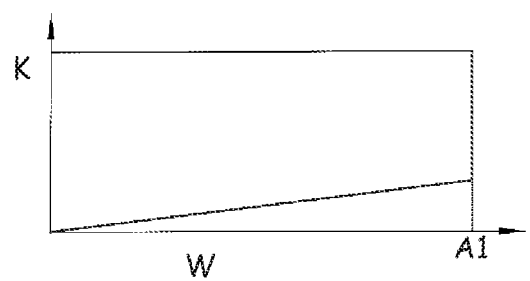

If, for example, the vehicle then travels over a made road which is not greatly uneven, the force/displacement characteristic line may become shallower owing to the additional volume being connected to the air spring, so that the air spring can deflect more softly, thereby significantly increasing comfort in normal driving operation. However, on the other hand this is disadvantageous in that if there is an unexpected pothole on the made road, when driving over the pothole, extremely high spring ranges are covered with such strong excitation, and there is the risk that if the impact point A1 is suddenly reached, the deflection is abruptly stopped, thereby causing a sudden increase in the force acting on the passengers in the vehicle (see FIG. 1B).

Figure 2A:
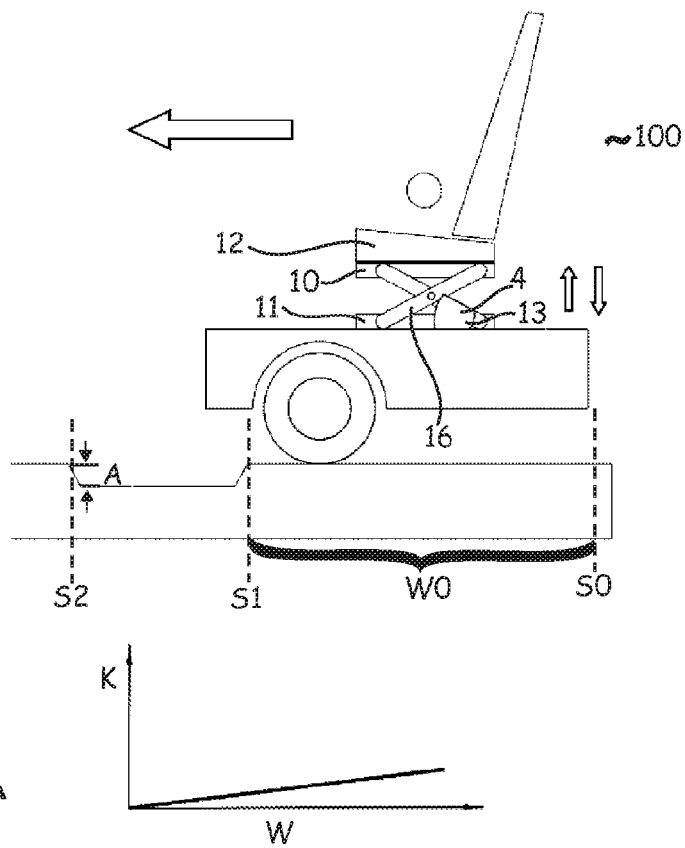
FIG. 2A is a schematic side view of a device which is described herein, is attached to a vehicle and comprises a suspension system, which moves in the direction of the arrow, and also shows a force/displacement characteristic line corresponding to the device.

FIG. 2A is a schematic side of a vehicle comprising an embodiment according to the present invention, the vehicle moving along a road in the direction of the arrow, a device 100 comprising a suspension system being mounted on the vehicle. In the present case, the device 100 comprising a suspension system is a vehicle seat. In this case, the device 100 comprises a suspension system 4, which comprises a first part 10 to which a mass 12 is applied, a second part 11 as well as an air spring 13 arranged between the first part 10 and said second part 11. In this case, the first part 10 is an oscillating part and the second part 11 is rigidly connected to the vehicle floor, the first part 10 and the second part 11 being movable relative to each other in an oscillating manner owing to a guide means 17, in the present case this being a scissor-action frame (this relative movement being shown by the smaller upward and downward arrows).

In particular, it can be seen from FIG. 2A that the air spring 13 is arranged between one of the scissor arms of the scissor-action frame of the guide means 17 and the second part 11, so that the air spring 13 can for example be compressed and/or squeezed together by a movement of the first part 10 for example towards the second part 11, that is to say during a deflection. It can also be seen from FIG. 2A that the vehicle is in a first displacement phase W0 between the displacement points S0 and S2, and that in this phase the first part 10 assumes a standardised height H from the vehicle floor. Along such a displacement section between the points S0 and S1, it is therefore particularly advantageous for the force/displacement characteristic line to be a particularly shallow characteristic line, as shown in FIG. 2A. Such a shallow characteristic line therefore provides the possibility of a particularly comfortable and soft deflection, thereby resulting in particularly high seating comfort.

Figure 2B:
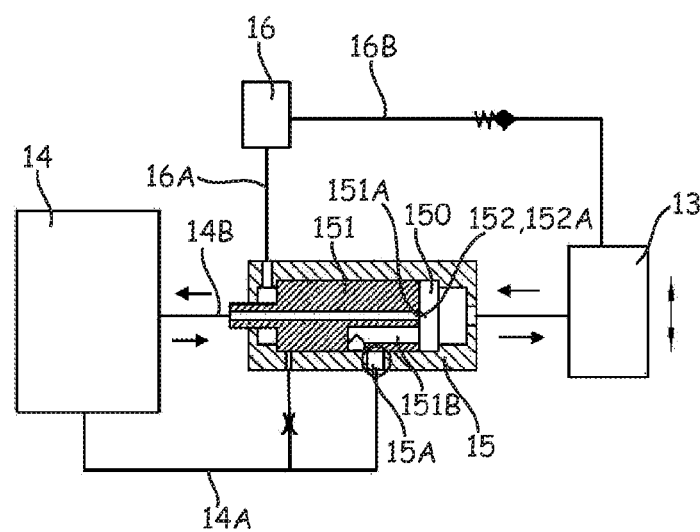
FIG. 2B is a schematic view of a pneumatic closed-loop control circuit for the device comprising a suspension system described in FIG. 2A.

FIG. 2B is a schematic view of a closed-loop control circuit of the device 100 for controlling, that is to say for setting, a force/displacement characteristic line of the air spring 13 during the deflection and/or rebound of the first part 10 relative to the second part 11. It can be seen that the device 100 comprises an additional volume means 14 for air in addition to the air spring 13, it being possible for the volume of the additional volume means 14 to be connected to the volume of the air spring 13 by means of a control means 15. Furthermore, via the control means 15, a pressure accumulator 16 and the additional volume means 14 are in fluid communication with the air spring 13 such that the force/displacement characteristic line of the air spring 13 can be modified depending on a deflection displacement and/or rebound displacement and/or speed and/or acceleration of the first part 10 relative to the second part 11 in a presettable manner, by connecting the additional volume means 14 and/or the pressure accumulator 16 by means of the control means 15 during the deflection and/or rebound of the first part 10 relative to the second part 11.

It can be seen in detail from FIG. 2B that the control means 15 comprises a cylinder 150 inside which a movable piston 151 is arranged, it being possible to connect the additional volume means 14 via a movement of the piston 151 inside the cylinder 150. The connection takes place inside the control means 15 via a valve means 152, which the control means 15 comprises, via which the position of the piston 151 inside the cylinder 150 can be modified in a presettable manner, the additional volume means 15 and the pressure accumulator 16 only being in fluid communication with the air spring 13 in the open position of the valve means 152. In particular, in the present case the valve means 152 is in the form of a flapper valve 152A, which is arranged on the piston 151 via its air opening 151A, via which the additional volume means 14 can be brought into fluid communication with the air spring 3. In this case, the valve means 152 and in particular the flapper valve 152A are operated in the open position if an internal pressure P3 of the pressure accumulator 16 is at least as great as an inner pressure P1 of the air spring 13, it being possible for the piston 151 to be displaced inside the cylinder 150 via the open position of the valve means 152 such that the additional volume means 14 can be connected. Such an open position of the flapper valve 152 is thus shown in FIG. 2B, the internal pressures P1, P2 and P3 of the air spring 13, of the additional volume means 14 and of the pressure accumulator 15, respectively, being equal when driving between the points S0 and S1, so that a pressure equilibrium prevails and the piston 151 is thus stationary inside the cylinder 150. In other words, the additional volume 14 is connected to the air spring 13 by the opened flapper valve 152A, so that a force/displacement characteristic line, as shown in FIG. 2A, is particularly shallow.

In addition, the device 100 described herein comprises a fluid connection 151B of the piston, via which, in addition to introducing air from the additional volume means 14 into the air spring 13 via the air opening 151A inside the piston 151, air can also be introduced into the air spring 13 over a large cross-sectional area of the piston 151. In this case, the fluid connection 151B of the piston is in the form of a fluid duct inside the piston 151. It can be seen that for conveying additional air through said fluid connection 151B of the piston inside the control means 15, at least one opening 15A is inserted in a housing of the control means 15, which passes through the entirety of the housing of the control means 15. In the present case, a connection opening in the fluid connection 151B of the piston can overlap at least in part inside the cylinder 151, it being shown in FIG. 2B that the piston 151 has reached the left-hand stop, resulting in the connection opening of the fluid connection 151B of the piston and the opening 15A in the housing of the piston 151 not overlapping, so that an air connection from the additional volume means 14, via a fluid line 14A which discharges into the opening 15A and through the fluid connection 151B of the piston, is itself obstructed by the piston 151. In other words, the additional volume means 14 is connected to the air spring 13 exclusively via a fluid line 14B and the opened flapper valve 152A. In this respect, a further fluid connection can be connected or disconnected via the fluid connection 151B of the piston via the respective positions of the piston 151 inside the cylinder 150 depending on the pressure difference between the internal pressure P1 inside the air spring 13 and the internal pressure P2 inside the additional volume means 14.

Furthermore, it can be seen from FIG. 2B that the pressure accumulator 16 is configured and provided for storing a pressure, the pressure accumulator 16 being in fluid communication with the control means 15 and in particular with the cylinder 150 via a fluid line 16A, and being directly connected to the air spring 13 via a fluid line 16B in which a non-return valve is arranged. Furthermore, the fluid line 14A is in fluid communication with an auxiliary line 14C. In particular, one end of the auxiliary line 14C is connected to the fluid line 14A and the other end thereof discharges into a further opening in the piston 151. In this case, the two lines 14A and 14C are in fluid communication with the cylinder 150 and discharge into said cylinder such that the piston 151 can be arranged between said two openings at least at points. In this case, at least one throttle valve 140C is provided in the auxiliary line 14C for reducing the pressure in the additional volume means 14 and/or in the pressure accumulator 16.

In principle, it should be noted that the device described herein may alternatively or additionally be based on a principle of rotation. In addition, the device described herein may also be used or designed in the form of horizontal suspension in a vehicle seat and/or in the form of cabin suspension in the vehicle seat.

Figure 3A:
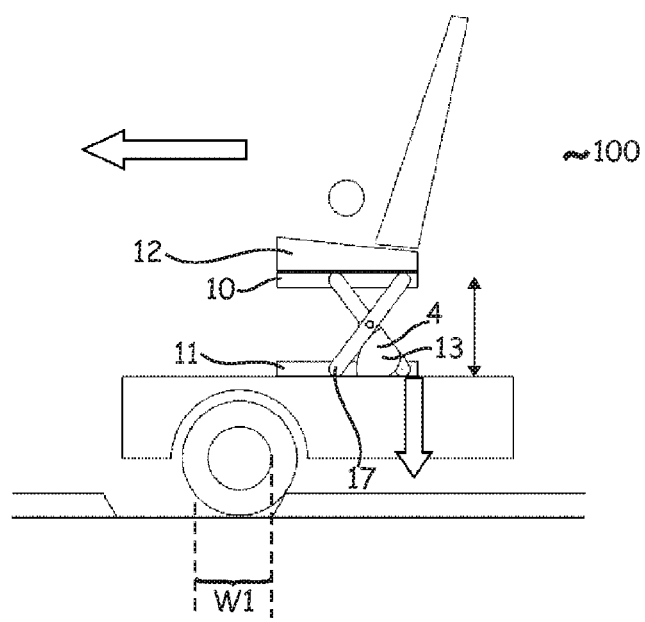
Figure 3A:
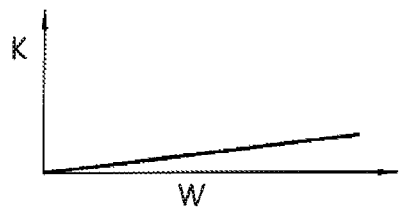
Figure 3B:
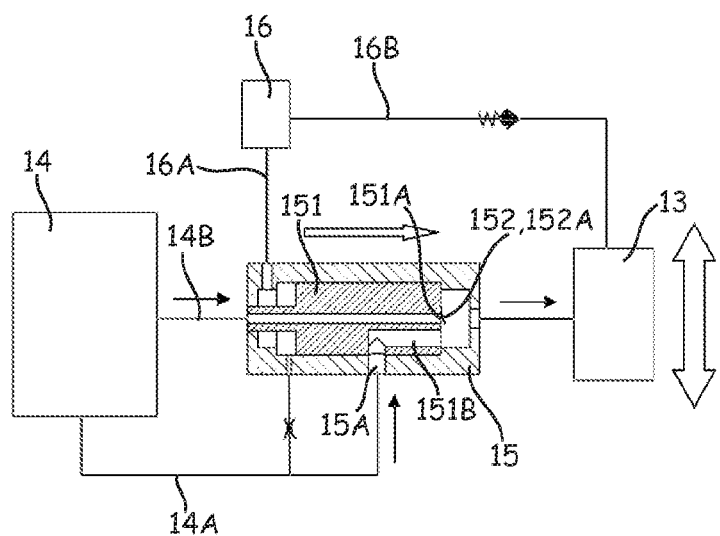

The vehicle described in FIG. 2A is shown again in FIG. 3A, the difference from FIG. 2A being that the vehicle is in a displacement phase W1 in which the vehicle is driving into the pothole and deflects therein. When driving into the pothole in the phase W1, the first part 10 rebounds away from the second part 11, and specifically exactly by an additional rebound height A, which indicates the depth of the pothole. In this displacement phase W1, the first part 10 is therefore positioned at a height H+A relative to the second part 11. In other words, in such a phase the suspension strongly rebounds, whereby an internal pressure P1 of the air spring 13 is less than an internal pressure P3 of the pressure accumulator, the piston 151, as shown in FIG. 3B, moving to the right owing to such a pressure difference. In addition, in this displacement phase W1 the internal pressure of the additional volume means 14 is also greater than the internal pressure P1 of the air spring 13, so that in each case the flapper valve 152A shown is open and air is also conveyed to the air spring 13 through the fluid connection 151B of the piston by the opening 15A inside the housing of the control means 15 via the line 14A, by means of the rightward movement towards a right-hand stop inside the cylinder 150 of the piston 151. Such a configuration together with the fluid connection 151B of the piston therefore allows a particularly rapid movement of the piston 151 towards the right-hand stop inside the cylinder 150, thereby also reducing reaction times of the modified deflection- and/or rebound conditions, for example. In this respect, a characteristic line remains shallow, as shown in FIG. 3A.

Figure 4A:
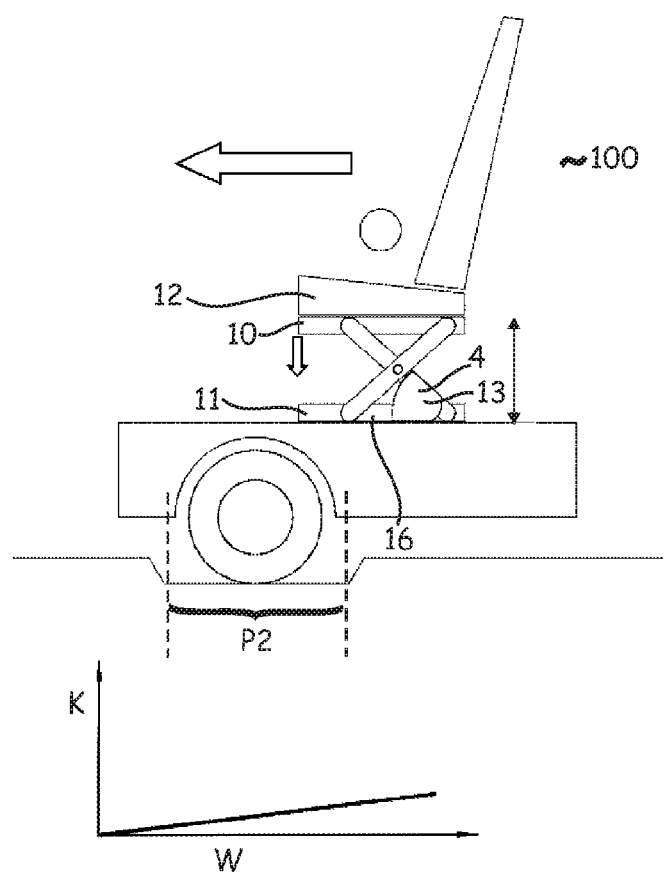
Figure 4B:
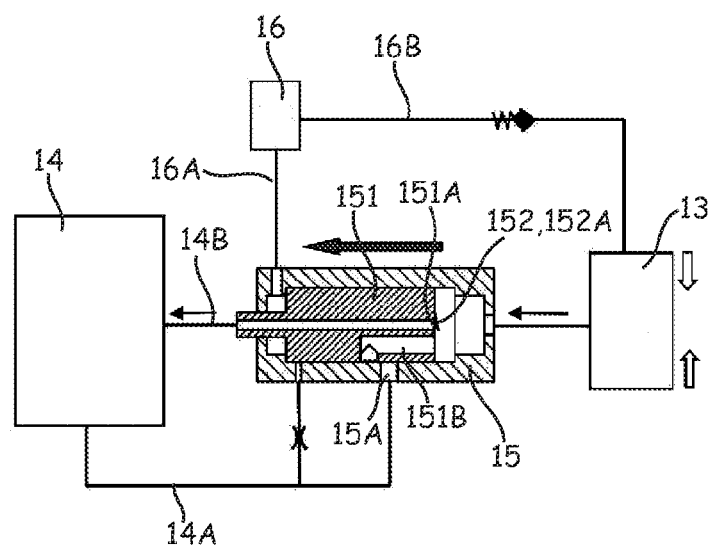

In FIG. 4A, the vehicle shown is entirely in the pothole and is therefore in displacement phase W2. During this displacement phase W2, the air spring 13 is only slightly deflected in relation to the depth A of the pothole, so that a height of the first part 10 relative to the second part 11 is measured by the value H2=H+A−X, X being the deflection displacement within the displacement phase W2. Owing to the increase in internal pressure, even if it is slight, inside the air spring 13, the piston is urged from the right-hand stop position inside the cylinder 150 to the left, so that, as shown in FIG. 4B, a fluid connection between the additional volume means 14 via the fluid line 14A and the opening 15A inside the control means 15 is itself obstructed by the piston 151. Owing the merely slight deflection, for example in relation to the depth A of the pothole, the flapper valve 152A always, however, remains open, whereby the additional volume means 14 remains connected to the air spring 13 in the displacement phase W2 even during such a deflection, whereby the force/displacement characteristic line always remains shallow. After such a deflection, pressure compensation is carried out by the control means 15, so that during such pressure compensation, the internal pressures P1, P2 and P3 of the air spring 13, of the additional volume means 14 and of the pressure accumulator 16, respectively, are equal. In other words, a deflection height of the first part 10 relative to the second part 11 is subsequently stabilised.

FIG. 5A shows how the vehicle passes through the displacement phase W3, and in said figure the vehicle is driving out of the pothole again, the first part 10, as clearly shown in FIG. 5A, moving towards the second part 11 and the entire vehicle seat deflecting. In other words, as shown in FIG. 5B, the air spring 13 is strongly deflected and/or squeezed, thereby producing an intensive flow of air from the air spring 13 towards the control means 15, and thus the flapper valve 152A is closed by the counterpressure on the piston 151. By means of such a closure of the flapper valve 152A, the additional volume means 14 is cut off from the air spring 13, whereby the force/displacement characteristic line for example abruptly changes its gradient from the point at which the vehicle begins to pass through the displacement phase W3. This advantageously results in there being no sudden impact, which is indeed uncomfortable for the person sitting in the seat, against a stop at an end point, owing to the air spring 13 being set to be harder. In other words, during this displacement phase W3 the internal pressure P1 of the air spring 13 and the internal pressure P3 of the pressure accumulator 16 is therefore greater than the internal pressure P2 of the additional volume means. In particular, in such a displacement phase the two internal pressures P1 and P3 are equal.

Such a modification to the force/displacement characteristic line when passing through the displacement phase W3 is in particular shown in the force/displacement characteristic line in FIG. 5A.

Figure 6A:
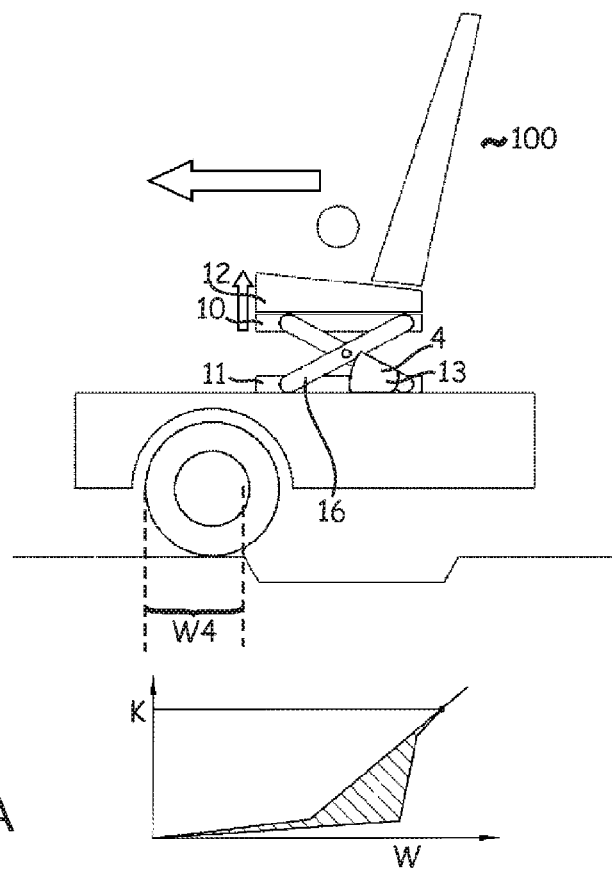
Figure 6B:
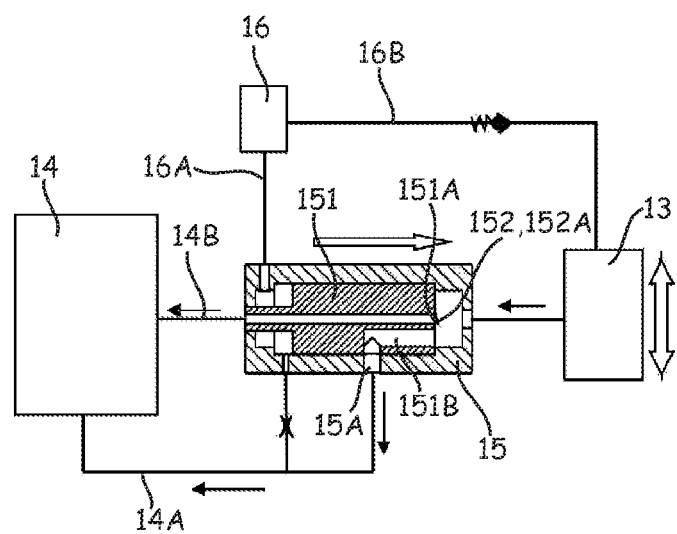

FIGS. 6A and 6B show a fourth phase of passing through the pothole, in which, in a displacement phase W4, the vehicle has completely driven out of the pothole, whereby the air spring 13 rebounds and, owing to such a pressure difference arising therefore and reduction of the internal pressure inside the air spring 13, with the internal pressure P3 inside the pressure accumulator 16 being greater than the internal pressure P1 of the air spring 13, the piston 151 is again moved to the right, whereby air is evacuated from the air spring 13. The energy E stored in the air spring 13 is reduced and a strong rebound is thus prevented. Then, a pressure compensation may in turn take place, by the individual pressures P1, P2 and P3 being equal, whereby the piston 151 is once again moved into its starting position according to FIG. 2B. Such a reduction in energy, as explained above, is shown in the force/displacement characteristic line as shown in FIG. 6A, which corresponds to an area between the force/displacement characteristic line shown in FIG. 5A and a force/displacement characteristic line found for example in the prior art.

In particular, it can also be seen from FIG. 6B that, as explained above, evacuation of air from the air spring 13 takes place, it also being seen that air also flows from the air spring 13 at least through the fluid connection 151B of the piston and, within the fluid line 14A, into the additional volume means 14. In other words, the opening 15A in the housing of the control means 15 and an opening in the fluid connection 151B of the piston overlap at least in part, thereby allowing a particularly rapid and simple evacuation of air.

In addition it is noted that the sequence of deflection when driving over a kerb, for example, is different from the sequence shown herein when driving over a pothole. When driving over a kerb, the deflection sequence and the closed-loop control owing to the sequences shown in the above figures and disclosed thereby can be described as follows by the following combination of figures: (2A, 2B)→(5A, 5B)→(6A, 6B)→(3A, 3B)→(4A, 4B)→(2A, 2B).

Figure 7:
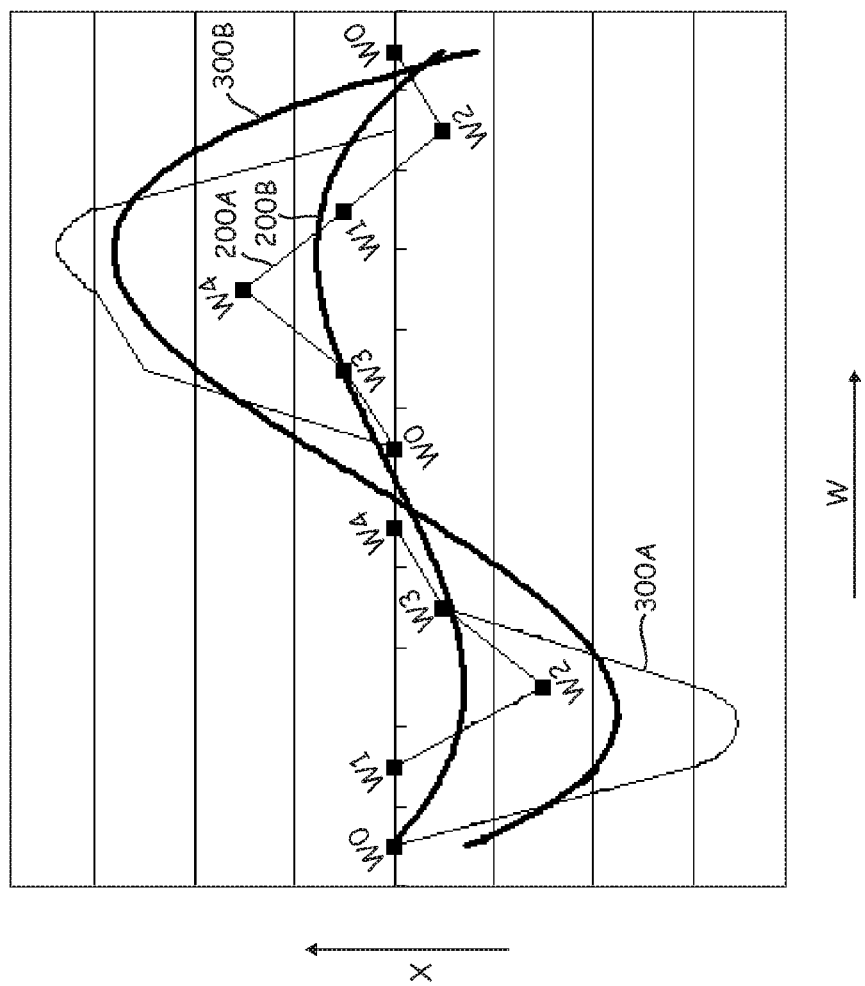
FIG. 7 is a graph showing various curves, in which a deflection displacement is plotted against respective displacement phases.

FIG. 7 compares a deflection displacement with the different displacement phases shown in FIG. 2A to 6A. In this case, the curve 200A corresponds to measured deflection- and rebound displacements from a zero position, the curve 200B representing a polynomial iteration of the curve 200A. In comparison therewith, a movement, that is to say a vertical movement of the second part 11, is shown on the same graph, in particular the curve 300A showing the measured movement- and vertical positions of the second part 11 and the curve 300B corresponding to the continuous curve, which is a polynomial iteration of the above curve. From the curves, it can inter alia be found that by means of the device 100 described herein and in particular the control means 15 described herein, the first part 10 can be deflected and thus damped relative to the second part 11 in a particularly individual and homogenous manner according to the individual displacement phases, owing to the interaction between the air spring 13, the additional volume means 14 and the pressure accumulator 16, and to the closed-loop control thereof by the control means 15.

The invention is not restricted by the description with reference to the embodiments. Rather the invention includes any new feature as well as combination of features which, in particular, any combination of features in the claims contains, even if this feature or this combination is not explicitly mentioned itself in the claims or in the embodiments.

LIST OF REFERENCE NUMERALS

A Depth A of the pothole
P1 Internal pressure P1
P2 Internal pressure P2
P3 Internal pressure P3
W0 Displacement phase W0
W1 Displacement phase W1
W2 Displacement phase W2
W3 Displacement phase W3
W4 Displacement phase W4
S0 Point S0
S1 Point S1
13 Air spring
4 Suspension system
10 First part
11 Second part
12 Mass
13 Air spring
14 Additional volume means
14A Fluid line
14B Fluid line
14C Auxiliary line
140C Throttle valve
15 Control means
15A Opening
16 Pressure accumulator
17 Guide means
16B Fluid line
100 Device
150 Cylinder
151 Piston
151A Air opening
151B Fluid connection of the piston
152 Valve means
152A Flapper valve
200A Curve
200B Curve

What is claimed is:

1. A device comprising:
a suspension system, the suspension system comprising;
a first part to which a mass is applied;
a second part;
at least one air spring arranged between said first part and said second part;
at least one additional volume means for air, the volume of which is selectively connected to a volume of the air spring in a controlled manner; and
a control means for connecting the volume of the additional volume means and the volume of the air spring, wherein via the control means, a pressure accumulator and the additional volume means are in fluid communication with the air spring such that a force/displacement characteristic line of the air spring is modified in a presettable manner depending on at least one of a deflection displacement, a rebound displacement, a deflection speed, a rebound speed, a deflection acceleration and a rebound acceleration of the first part relative to the second part, by connecting at least one of the additional volume means and the pressure accumulator by means of the control means during the deflection and rebound of the first part relative to the second part, wherein the control means is free of electrical components.

2. The device according to claim 1, wherein the control means comprises a cylinder inside which a movable piston is arranged, the additional volume means and the pressure accumulator are selectively connectable via at least one of a movement and a presettable position of the piston inside the cylinder.

3. The device according to claim 2, wherein the control means comprises at least one valve means, via which the position of the piston inside the cylinder can be at least one of modified and set in a presettable manner, and at least one of the additional volume means and the pressure accumulator is brought into fluid communication with the air spring in an open position of the valve means.

4. The device according to claim 3, wherein the valve means is in the form of a flapper valve, which is arranged on an air opening of the piston, via which the additional volume means is selectively brought into fluid communication with the air spring.

5. The device according to claim 4, wherein, depending on at least one of the deflection displacement, the rebound displacement, the speed, and the acceleration of the first part relative to the second part and on the internal pressure of the air spring which is dependent thereon, the flapper valve opens or closes automatically.

6. The device according to claim 3, wherein the valve means is operated in the open position if an internal pressure of the pressure accumulator is greater than an internal pressure of the air spring, wherein the piston is selectively displaced inside the cylinder via the open position of the valve means such that the additional volume means can be connected.

7. The device according to claim 3, wherein the valve means is operated in a closed position if an internal pressure of the pressure accumulator is equal to an internal pressure the air spring, and an internal pressure of the additional volume means is less than one of the internal pressure of the pressure accumulator and the internal pressure of the air spring.

8. The device according to claim 1, wherein, after at least one of the deflection and rebound of the first part, a pressure compensation is carried out by the control means, the internal pressures of the air spring, of the additional volume means and of the pressure accumulator, respectively, being equal in the pressure compensation.

9. The device according to claim 1, wherein the air spring is coupled to the additional volume means via a fluid connection of a piston of the control means, the fluid connection of the piston is a fluid duct inside the piston, and the additional volume means is selectively connected to the air spring via the fluid connection of the piston, via a movement of the piston in a cylinder of the control means.

10. The device according to claim 1, wherein the first part is an oscillating part and in that the second part is a stationary part.

11. The device according to claim 1, wherein the first part is coupled to the second part via a guide means, wherein the guide means is a scissor-action frame.

12. A device comprising a suspension system, the suspension system comprising:
- a first part to which a mass is applied;
- a second part;
- at least one air spring arranged between said first part and said second part;
- at least one additional volume means for air, the volume of which is selectively connected to a volume of the air spring in a controlled manner;
- a control means for connecting the volume of the additional volume means and the volume of the air spring, wherein via the control means, a pressure accumulator and the additional volume means are in fluid communication with the air spring such that a force/displacement characteristic line of the air spring is modified in a presettable manner depending on at least one of a deflection displacement, a rebound displacement, a deflection speed, a rebound speed, a deflection acceleration and a rebound acceleration of the first part relative to the second part, by connecting at least one of the additional volume means and the pressure accumulator by means of the control means during the deflection and rebound of the first part relative to the second part; and
- wherein in a first configuration of the control means the additional volume means and the air spring means are connected by a first fluid line with a first communication path that passes through a piston of the control means, wherein in a second configuration of the control means the additional volume means is connected to the air spring by the first fluid line and by a second fluid line with a second communication path that passes through the piston of the control means.

\* \* \* \* \*